Figure 1:
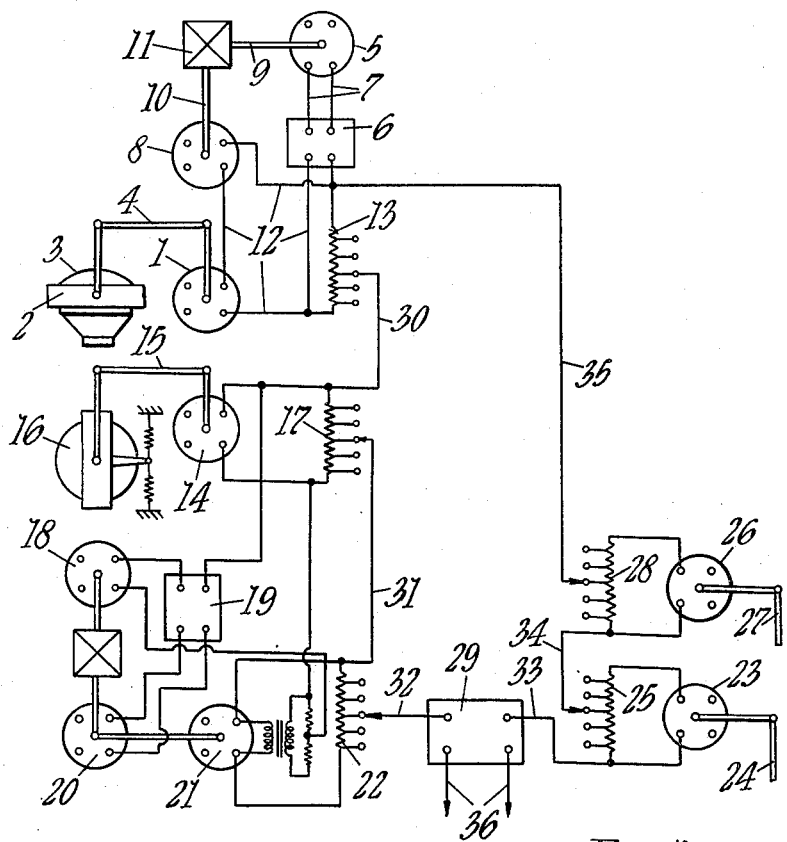

July 24, 1962     J. V. FOLL ETAL     3,045,630
SHIP STABILIZATION
Filed March 6, 1961

3,045,630
SHIP STABILIZATION
John Victor Foll and John Bell, Beckenham, England, assignors to Muirhead & Co. Limited, Beckenham, England
Filed Mar. 6, 1961, Ser. No. 93,676
Claims priority, application Great Britain Mar. 22, 1960
3 Claims. (Cl. 114—122)

This invention relates to control equipment and particularly to control equipment for ship stabilizing systems.

In a previous system of control equipment for ship stabilization the principal sensing elements are a vertical-keeping gyroscope and a velocity or rate gyroscope. From these two basic sensing devices electrical signals proportional to roll (or pitch) angle ($\theta$) and roll (or pitch) velocity ($\dot{\theta}$) are derived through the medium of synchro elements. A further signal responsive to roll (or pitch) acceleration ($\ddot{\theta}$) is derived in one embodiment of the invention by a mechanical differentiating device. A further signal is derived from the vertical-keeping gyroscope which is continuously responsive to the true vertical and the list of the ship (if any) and this signal is employed to modify the roll angle signal derived directly from the vertical-keeping gyroscope in such a manner that the ship is stabilized to the listed position rather than to the true vertical.

The synchro elements are generally of the known kind in which the output signal is an alternating current or voltage varying sinusoidally in response to the rotational input signal.

Control equipment in accordance with the above mentioned previous system tends to be large, heavy and costly. As the number of control functions in a stabilizer control has increased, the adjustment of the sensitivity required of each has become more difficult to achieve with the apparatus previously used which depends on mechanical linkages and synchros having sinusoidal outputs.

An object of the present invention is to reduce the size and weight of a ship stabilizer control equipment.

A further object is to improve the accuracy of the derived functions of roll (or pitch).

A still further object is to provide for more ready adjustment of the control signals and arrange conveniently for further control signals to be added.

The invention consists in a ship stabilizer control system comprising means for deriving linear electrical control signals, stepped potentiometer means for adjusting the magnitude of the respective signals and electrical amplification means for combining and amplifying the signals.

The control functions to be combined may be from the outputs of synchro elements of the kind in which the amplitude of the A.C. output varies linearly with rotor displacement. An example of this type bears the name "Linvar" (R.T.M.). Synchro elements of this kind are also referred to as induction regulators and this term will be used hereafter in the description. Other kinds of synchros, for example the kind in which the amplitude of the A.C. varies sinusoidally, may be used when the angular displacements are small. Electronic means are employed to derive certain functions thereby dispensing with less accurate mechanical devices. The electrical signals related to the various functions of roll (or pitch) are applied to stepped potentiometers enabling the magnitude of each signal to be adjusted as required and the signals are then combined in an amplifier which may employ thermionic tubes, transistors, magnetic transductors and the like. It is preferred, in the interests of lightness and compactness to use transistorised amplifiers for this application and in the servo systems to be described hereinafter. The power gain obtained by the use of amplifiers permits the use of small size synchros having low moments of inertia and reduced mechanical losses and correspondingly smaller and lighter gyroscopes. More exact differentiation can also be obtained.

Figure 2:
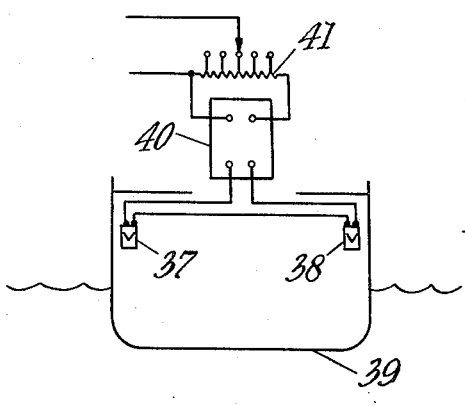

In order that the invention may be more clearly understood, an embodiment thereof will now be described by way of example with reference to the accompanying drawings, in which:

FIGURE 1 is a diagrammatic representation of a ship stabilizer control apparatus according to the invention and FIGURE 2 is a diagrammatic representation of the cross section of a ship showing the location and connections of alternative control arrangements.

In FIGURE 1, induction regulator 1 is linked for rotation to gimbal 2 of vertical-keeping gyroscope 3 over linkage 4. Servo-motor 5 of which the control field winding is energised from the output of servo amplifier 6 over leads 7 drives induction regulator 8 over shafts 9 and 10, and reduction gear 11. The outputs of induction regulators 1 and 8 are connected in series to the input of servo amplifier 6 over connection 12 and also to stepped potentiometer 13 so that the potential across potentiometer 13 is the algebraic sum of the outputs from induction regulators 1 and 8.

The function of this part of the equipment is to derive from induction regulator 8 a signal proportional to the mean of the roll angle and to apply it as a correction to the roll angle signal derived from induction regulator 1.

In order to reduce the load on the stabilizing means and also the drag opposing the forward motion of the ship, it is desirable to stabilize the ship having regard to any list which may be present and not to the true vertical. The apparatus so far described which comprises a known servo system effects this desired stabilization in the the following manner:

The electrical zeros of induction regulators 1 and 8 are aligned in known manner when the ship is upright, that is to say, when the true vertical and the ship's vertical axes are coincident. If now the ship commences to roll, the servo system will attempt to turn element 8 to a position where its output voltage will be equal and opposite to the voltage produced by element 1, but because of the reduction gear 11 interposed between the servo-motor 5 and element 8, the movement of the latter will be slow and it will not depart substantially from zero because the servo will be responding to a succession of equal and opposite signals. Thus, the signal voltage on potentiometer 13 will sensibly represent the roll angle with respect to the true vertical. When the ship takes a list the signal applied to the servo amplifier 6 will be unsymmetrical with respect to the zero axis of elements 1 and 8 and servo-motor 5 will run for a longer period in one direction and a shorter period in the other direction. Thus, over a period of time which is dependent upon the roll period the list angle and speed ratio of gear box 11, the electrical axis of element 8 will gradually assume a position where again the signals are equal and opposite and element 8 will then have an output corresponding to the angle of list. The control signal at potentiometer 13 will now represent roll angle related to the list angle.

Induction regulator 14 is connected for rotation over link 15 with rate gyroscope 16 of known kind. The electrical output of induction regulator 14 is applied to stepped potentiometer 17 so that the potential developed is proportional to roll velocity ($\dot{\theta}$). The output of element 14 also provides the input to an electrical servo-system provided with velocity damping comprising induction regulator 18 servo amplifier 19, servo-motor 20 and tachometer-generator 21. Such a servo system is well known to those versed in the art and needs no further description.

Stepped potentiometer 22 is fed from the output of tachometer generator 21 and, as is well known, the output voltage appearing across potentiometer 22 will be proportional to the first derivative of the input signal ($\dot{\theta}$) which, it will be apparent, is ($\ddot{\theta}$) or roll acceleration.

Induction regulator 23 is coupled for rotation to the ship's steering means (not shown) over link 24, the output being fed to stepped potentiometer 25. The action of helm or steerage results in two effects which may or may not be closely related, namely, a heeling moment and a centrifugal force due to the ship's departure from linear motion. A compensating signal to reduce heeling may be introduced into the stabilizer control by the helm control.

Induction regulator 26 is coupled for rotation to the stabilizing means (not shown) over linkage 27 and its output is fed to stepped potentiometer 28. In a ship stabilizer employing tilting fins or hydrofoils, element 26 would produce a signal proportional to the angle of tilt of the fin, the signal being applied to the stabilizer control in the sense of positive feedback to increase the sensitivity of the control.

It will be seen that electrical signals derived from potentiometers 13, 17, 22, 25 and 28 are proportional to the instantaneous roll angle (compensated for list angle), roll velocity, roll acceleration, helm and feedback respectively. The outputs from these potentiometers are connected in series to the input of amplifier 29 over leads 30 to 35, the output potentials being adjusted as required by selecting appropriate tapping points. The output of amplifier 29, which represents the algebraic sum of the input potentials, is fed over connection 36 to the first stage (not shown) of a mechanical, hydraulic, electrical or other form of amplification system for operating the stabilizing means. A series system of connections is shown but a parallel system may be equally well employed if desired.

FIGURE 2 shows an alternative method of measuring the acceleration of the rolling motion of a ship and producing a corresponding A.C. signal.

A pair of accelerometers 37, 38, of known kind, for example, piezo-electric or seismic, are mounted as far apart as convenient towards the extremes of the beam of the ship 39, their outputs being connected to the input of amplifier or modulator 40 in such sense that the accelerations due to roll will be additive. It will be appreciated that with accelerometers giving an A.C. output, a normal A.C. amplifier will be effective in boosting the signal, but with accelerometers whose output is D.C. it is necessary to feed the signal to a modulator in order to derive an A.C. signal that varies in response to the D.C. modulating signal. Such modulators are well known to those versed in the art. The output from the amplifier (or modulator) 40 is fed to a tapped potentiometer 41 which may be included in the series connected potentiometer circuit of FIGURE 1 in substitution for tapped potentiometer 22 and associated parts 18 to 21.

Because of the use of electronic amplification in the above described stabilizer control the initial forces required to produce each function of the rolling motion are extremely small so that the induction regulators may well be of the miniature type and the gyroscopes may also be of small size and weight.

A novel ship stabilizer control apparatus has been described that may be both small and light but has all the characteristics of hitherto known systems, with improved accuracy in deriving the functions of the ship's rolling motion.

It will be understood that no restriction is made to the particular forms of embodiment and details of construction illustrated in the drawings which are quoted merely by way of example, and that numerous modifications are quite possible within the meaning of the above description and the annexed claims.

We claim:

1. A ship stabilizer control system comprising means for detecting the components of roll of a ship, means for generating for each component of roll a linearly proportional electrical signal, resistive loads across each of said generating means, means for tapping pre-selected levels of the electrical signals across each of said resistive loads, amplifying means, said pre-selected signal levels being connected in series so that the algebraic sum of said pre-selected signal levels is applied to the input of the amplifying means, the output of said amplifying means being applied to control the stabilizing means.

2. A ship stabilizer control system as claimed in claim 1 in which the means for deriving the linear control signal proportional to roll comprises a pair of initially aligned induction regulators, a vertical-keeping gyro linked to control the output of one of the induction regulators, a reduction gear linked to control the output of the other induction regulator, a servo amplifier the input of which is obtained from the output of the two induction regulators in series and a servo-motor operated from the servo amplifier and driving the reduction gear.

3. A ship stabilizer control system as claimed in claim 1 comprising means for deriving a linear control signal proportional to roll acceleration, third potentiometer means manually adjustable independently for deriving a predetermined proportion of the roll acceleration signal and means for combining the predetermined portion of the roll acceleration signal in series with the predetermined proportions of the roll and roll velocity signals.

References Cited in the file of this patent

UNITED STATES PATENTS

| | | |
|---|---|---|
| 2,130,929 | Rocard | Sept. 20, 1938 |
| 2,487,793 | Esval et al. | Nov. 15, 1949 |
| 2,619,623 | Meredith | Nov. 25, 1952 |
| 2,832,305 | Bell | Apr. 29, 1958 |
| 2,901,996 | Bell | Sept. 1, 1959 |
| 2,958,305 | Montrose-Oster | Nov. 1, 1960 |
| 2,979,010 | Braddon et al. | Apr. 11, 1961 |

FOREIGN PATENTS

| | | |
|---|---|---|
| 821,138 | Great Britain | Sept. 30, 1959 |